United States Patent
Chao et al.

(10) Patent No.: US 6,351,377 B1
(45) Date of Patent: Feb. 26, 2002

(54) FIXING APPARATUS OF DATA STORING DEVICE

(75) Inventors: Jackie Chao, Taipei; James Chen, Yung Ho, both of (TW)

(73) Assignee: Lite-On Enclosure Inc., Taipei (TW)

( * ) Notice: Subject to any disclaimer, the term of this patent is extended or adjusted under 35 U.S.C. 154(b) by 0 days.

(21) Appl. No.: 09/531,514

(22) Filed: Mar. 21, 2000

(51) Int. Cl.[7] .............................. G06F 1/16; H95K 5/00; G11B 33/02
(52) U.S. Cl. ................. 361/685; 248/634; 248/618; 360/96.1; 360/137; 312/332.1; 369/75.1; 369/77.1
(58) Field of Search ................................. 361/683, 684, 361/685, 686, 732; 369/75.1, 75.2, 76, 77.1, 77.2, 78, 79, 80, 81, 82; 312/332.1, 333, 96.1–96.5; 360/137, 137 D; 248/618, 633, 634, 636, 638

(56) References Cited

U.S. PATENT DOCUMENTS

| 5,544,142 A | * | 8/1996 | Funakiri | 369/75.1 |
| 5,659,441 A | * | 8/1997 | Eckberg et al. | 360/75.1 |
| 5,808,996 A | * | 9/1998 | Aoyama | 369/77.1 |
| 6,272,011 B1 | * | 8/2001 | Chen | 361/685 |

FOREIGN PATENT DOCUMENTS

| DE | 3328242 A1 | * | 2/1985 | H05K/5/00 |
| JP | 405174557 A | * | 7/1993 | G11B/33/02 |
| JP | 405174558 A | * | 7/1993 | G11B/33/02 |

* cited by examiner

Primary Examiner—Leo P. Picard
Assistant Examiner—Lisa Lea-Edmonds
(74) Attorney, Agent, or Firm—Rosenberg, Klein & Lee

(57) ABSTRACT

A fixing apparatus of a data storing device comprises a lower case an upper case, and two combining elastic pieces. The left and right sides of this lower case each has a combining portion having a combining elastic piece thereon. The upper case is installed above the lower case; and two combining elastic pieces each has a buckling portion and a movable portion, the movable portion can drive the buckling portion, and the two combining elastic pieces is connected to left and right sides of the upper case. The data storing device can be disposed between the upper case and the lower case, and then the buckling portions of the combining elastic pieces connected to the left and right sides of the upper case are buckled to the combining holes of the lower case so that the data storing device is clamped and fixed between the upper case and lower case.

5 Claims, 4 Drawing Sheets

FIXING APPARATUS OF DATA STORING DEVICE

FIELD OF THE INVENTION

The present invention relates to a fixing apparatus of a data storing device, and especially to a novel designed fixing apparatus of a data storing device without needing any screws in assembly. Thus, the present invention is time and labor saving with a fast production speed.

BACKGROUND OF THE INVENTION

Other than hard disk drivers and floppy disk drivers, optic disk drivers are another device for a computer to read or write data thereon. In general, an optic disk driver may store data of at most 650 MB. Since the capacity is very large, many software programs are stored in optic disk drivers. Therefore, optic disk driver is a necessary device for a computer.

However, the prior art optic disk driver and other data storing devices are fixed to a computer mainframe through a large amount of screws. Much labors and hours are needed in assembly. Moreover, the screws required increases the cost so as to increase the manufacturing cost.

SUMMARY OF THE INVENTION

Accordingly, the primary object of the present invention is to provide a fixing apparatus of a data storing device comprising a lower case, an upper case, and two combining elastic pieces. The data storing device can be disposed between the upper case and the lower case, and then the buckling portions of the combining elastic pieces connected to the left and right sides of the upper case are buckled to the combining holes of the lower case so that the data storing device is clamped and fixed between the upper case and lower case without using any screw. The assembling work requires less hours and time with a fast speed. Thus, the manufacturing cost is reduced greatly.

The various objects and advantages of the present invention will be more readily understood from the following detailed description when read in conjunction with the appended drawing.

DETAILED DESCRIPTION OF THE PREFERRED EMBODIMENTS

Figure 1:
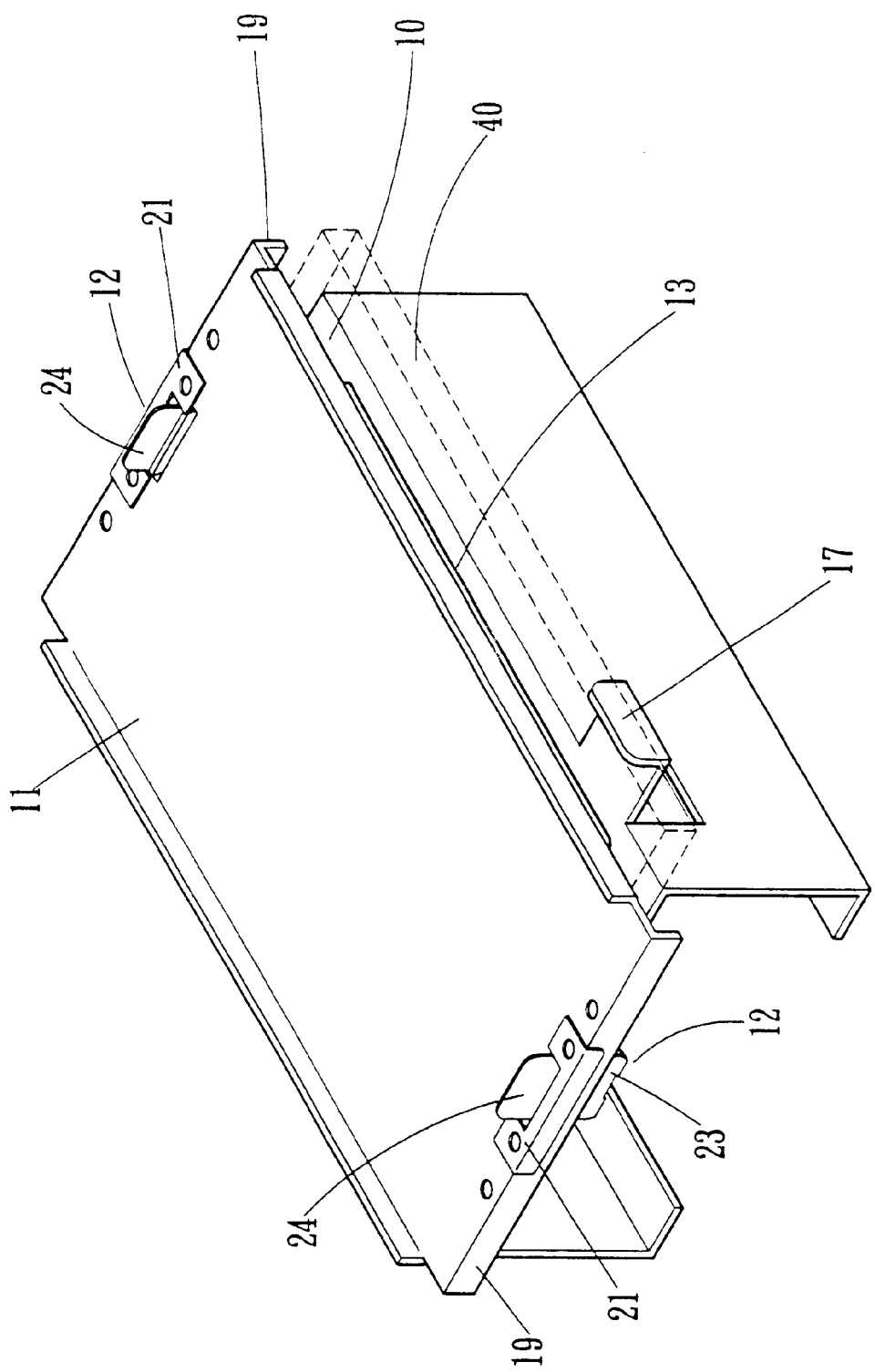
FIG. 1 is an assembled perspective view of the present invention.
Figure 2:
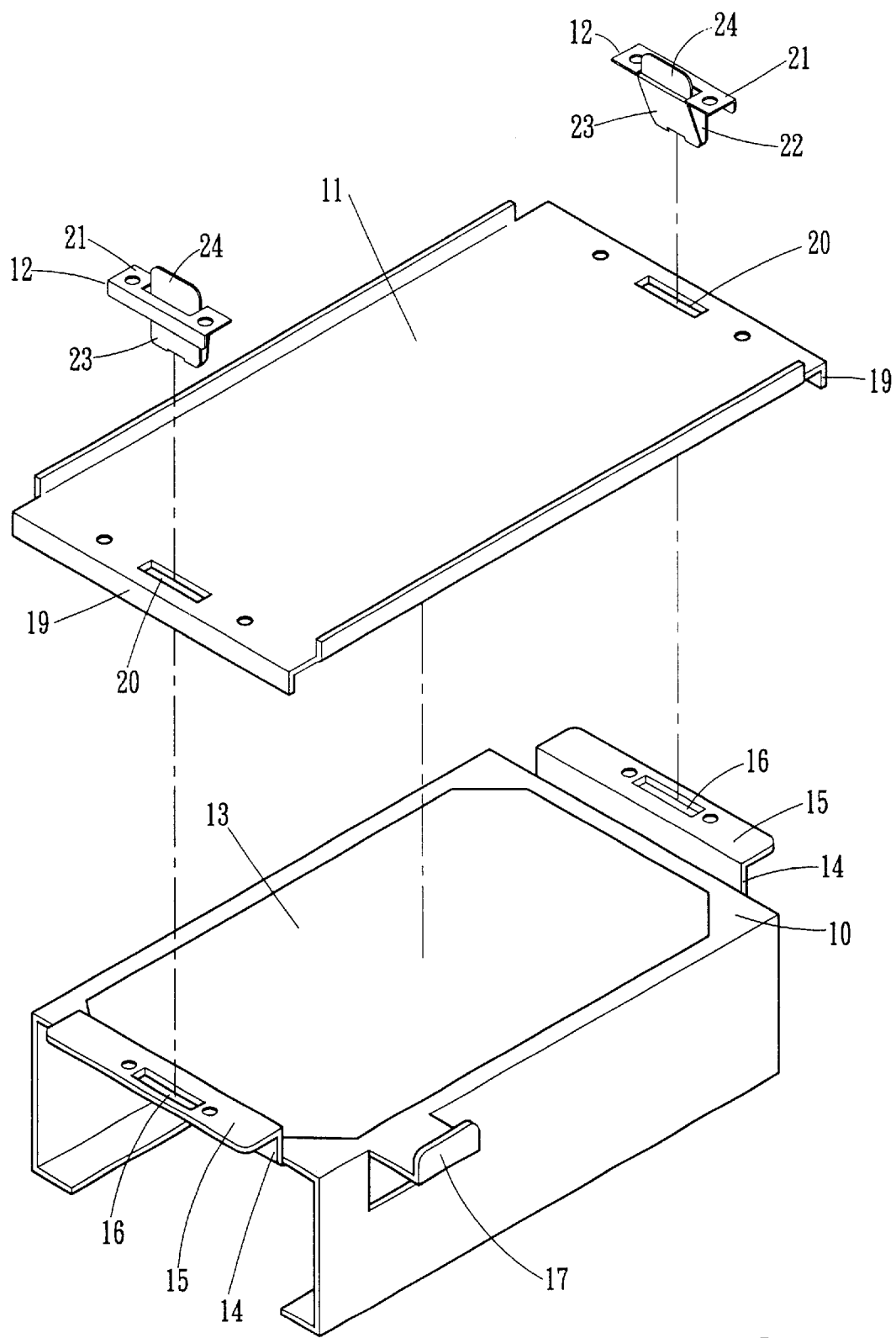
FIG. 2 is an exploded perspective view of the present invention.
Figure 3:
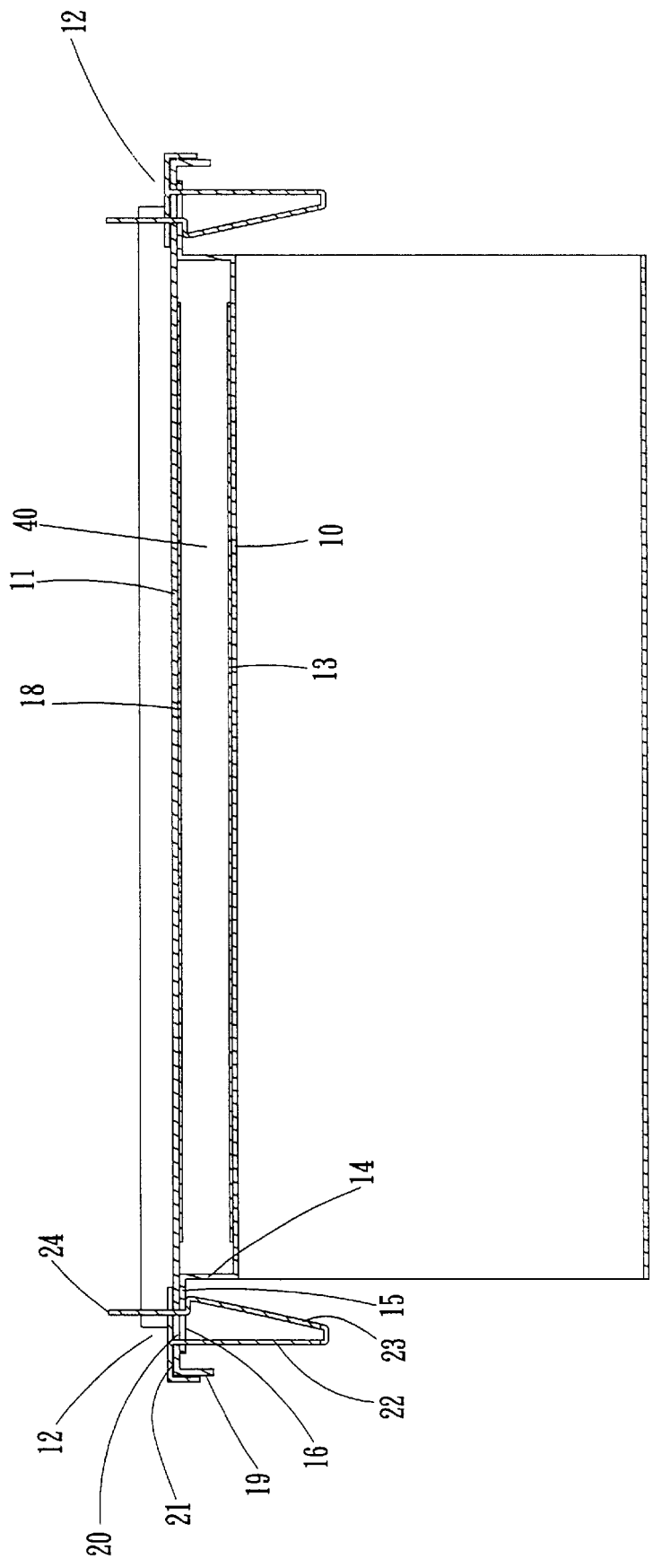
FIG. 3 is a cross sectional view of the present invention.
Figure 4:
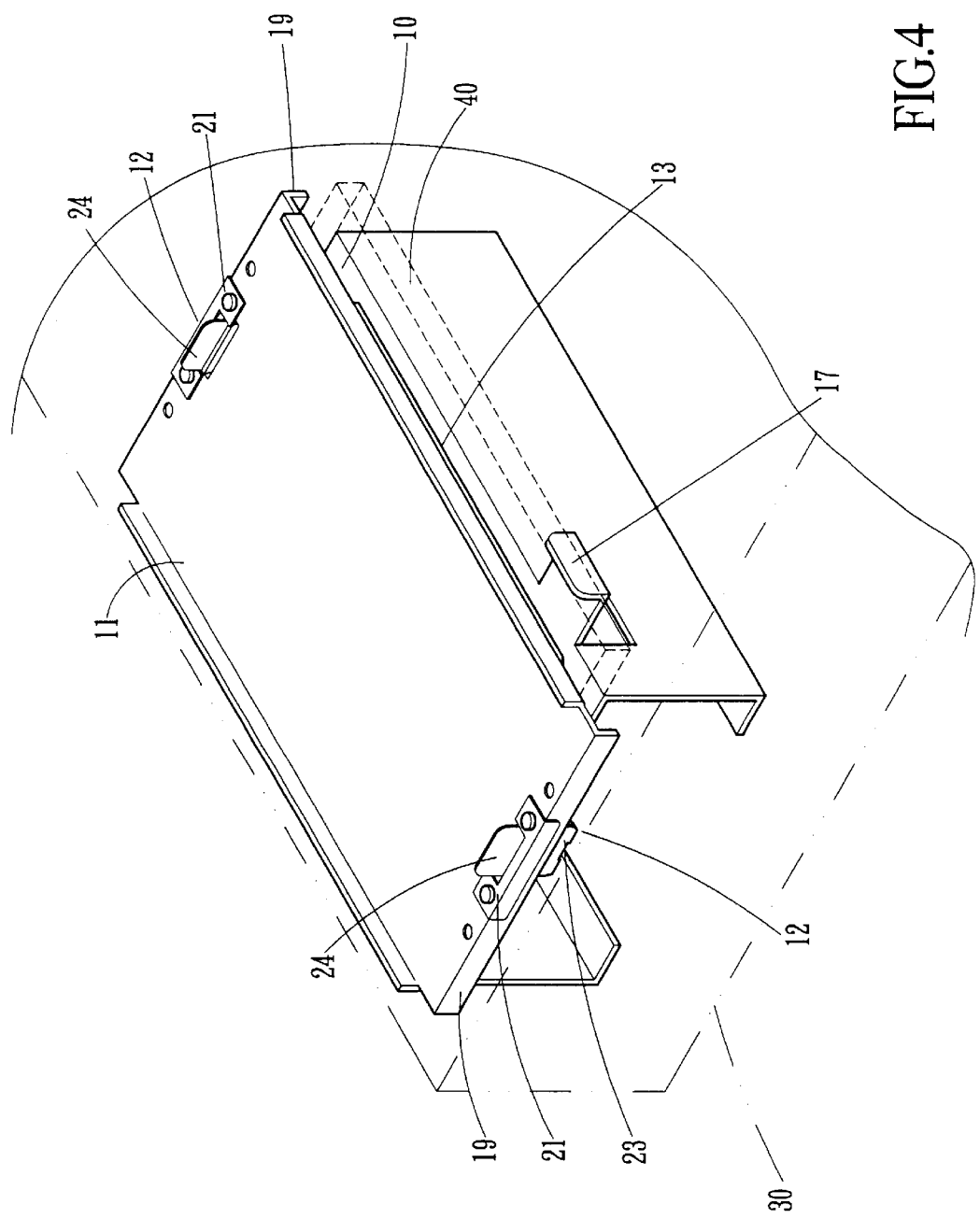
FIG. 4 is a schematic view showing the present invention is installed to a mainframe of a computer.

With reference to FIGS. 1, 2, and 3, a fixing apparatus of a data storing device according to the present invention is illustrated. The fixing apparatus of a data storing device includes a lower case 10, an upper case 11, and two combining elastic piece 12. The lower case 10 is made of a metal plate by punching and can be firmly secured within a computer mainframe (as shown in FIG. 4). The lower case 10 has an approximate "⊓" shape and the top thereof is adhered to a pad 13 made of rubber material. Left and right sides of the lower case 10 are formed with respective lateral plates 14. The upper end of each lateral plate 14 is formed with a horizontal connecting portion 15 on which a combining hole 16 is installed. Moreover, a stopper 17 with an approximate "L" shape is installed at the rear side of the top of the lower case 10 for resisting against an optic disk driver or other data storing device 40.

The upper case 11 is made of metal plate through punching and is installed above the lower case 10. The upper case 11 has an approximate "⊓" shape with a lower height. A pad 18 made of rubber material is adhered to the bottom thereof, and the left and right sides of the upper case 11 is formed with a lateral plate 19 and a through hole 20, respectively.

The combining elastic pieces 12 each is made of metal piece with good elasticity and has a horizontal fixing portion 21. The inner side of the fixing portion 21 is connected to a vertical connecting portion 22. The lower end of the connecting portion 22 is connected to an inclined buckling portion 23. The upper end of the buckling portion 23 is connected to a movable portion 24. Thus the combining elastic piece can be connected to the buckling portion 23 through the movable portion 24. The fixing portion 21 of each combining elastic piece 12 is connected to the left and right sides at the top of the upper case 11 by welding or riveting so that the two combining elastic pieces 12 are firmly secured to the upper case 11. The connecting portions 22 and the buckling portions 23 of the two combining elastic pieces 12 penetrates through the through holes near the left and right sides on the top of the upper case 11 so that the connecting portion 22 and the buckling portion 23 of each combining elastic piece 12 protrudes from the bottom of the upper case 11.

As shown in FIGS. 1, 3, and 4, the data storing device 40 can be disposed on the lower case 10. Then the upper case 11 covers on the data storing device 40. The connecting portion 22 and the buckling portion 23 of each combining elastic piece 12 connected to the left and right sides of the upper case 11 inserts to the combining hole 16 on the connecting portions 15 at the left and right sides of the lower case 10. When the connecting portion 22 and the buckling portion 23 of each combining elastic piece 12 have been inserted into the combining hole 16, due to the confinement of the combining hole 16, the angle between the connecting portion 22 and the buckling portion 23 become small for being inserted conveniently. When the connecting portion 22 and the buckling portion 23 completely inserts into the combining hole 16, since the confinement of the combining hole 16 has been released, the connecting portion 22 and the buckling portion 23 can be ejected outwards so that the angle the between become larger, and thus the upper end of the buckling portion 23 ejects against the outer lower edge of the combining hole 16. Thereby, by the two combining elastic pieces 12 to connect the lower case 10 and the upper case 11, then the data storing device 40 can be clamped and fixed between a lateral plate of lower case 10 and the upper case 11 without using any screw. Thus, the assembling work of the present invention is time and labor saving, and therefore, the manufacturing cost is also saved. If the data storing device 40 is desired to be taken out, it is only necessary to move the movable portions 24 of the two combining elastic pieces 12 outwards so that the upper end of the buckling portion 23 separates from the outer lower edge of the combining hole 16. Then, the connecting portions 22 and the buckling portions 23 of the combining elastic pieces 12 at the left and right sides of the upper case 11 can be withdrawn from the combining holes 16 on the connecting portions 15 at the left and right sides of the top of lower case 10. Therefore, the lower case 10 is separated from the upper case 11 in order to locate the data storing device 40.

In summary, the present invention has improved the defects in the prior art. In prior art fixing means of a data storing device, a large amount of screws are necessary with mach labor and time for assembly. Therefore, the production speed is low with a higher cost. While these defects are improved by the present invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A fixing apparatus of a data storing device comprising:

a lower case, a left and right sides of this lower case each having a combining portion having a combining elastic piece thereon;

an upper case installed above the lower case; and two combining elastic pieces each having a buckling portion and a movable portion, the movable portion can drive the buckling portion, and the two combining elastic pieces being connected to left and right sides of the upper case;

wherein the data storing device can be disposed between the upper case and the lower case, and then the buckling portions of the combining elastic pieces connected to the left and right sides of the upper case are buckled to the combining holes of the lower case so that the data storing device is clamped and fixed between the upper case and lower case.

2. The fixing apparatus of a data storing device as claimed in claim 1, wherein each of a top portion of the lower case and a lower portion of the upper case is adhered with a pad.

3. The fixing apparatus of a data storing device as claimed in claim 1, wherein each of the left and right sides of the lower case is formed with a lateral plate, and the combining portion is formed at an upper end of the lateral plate.

4. The fixing apparatus of a data storing device as claimed in claim 1, wherein a stopper is installed at a rear side of the lower case for being resisted and positioned by the data storing device.

5. The fixing apparatus of a data storing device as claimed in claim 1, wherein each of left and right sides of the upper case is formed with a through hole, and each combining elastic piece has a fixing portion; an inner end of the fixing portion is connected to a connecting portion; a lower end of the connecting portion is connected to the buckling portion; an upper end of the buckling portion is connected to the movable portion; the two combining elastic pieces are fixed to left and right sides of the upper case through the fixing portion; the connecting portion and buckling portion of each combining elastic piece pass through the through holes at left and right sides of the upper case; so that the connecting portions and the buckling portions of combining elastic pieces protrude from a bottom of the upper case for buckling with the combining holes at the left and right sides of the lower case.

* * * * *